US006332081B1

(12) United States Patent
Do

(10) Patent No.: US 6,332,081 B1
(45) Date of Patent: *Dec. 18, 2001

(54) ARRANGEMENT FOR IMPROVING AVAILABILITY OF SERVICES IN A COMMUNICATION SYSTEM

(75) Inventor: Thanh Van Do, Oslo (NO)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,216

(22) Filed: Oct. 5, 1999

Related U.S. Application Data

(63) Continuation of application No. PCT/NO98/00108, filed on Apr. 2, 1998.

(30) Foreign Application Priority Data

Apr. 8, 1997 (NO) .................................................. 971605

(51) Int. Cl.$^7$ ..................................................... H04Q 7/20
(52) U.S. Cl. ............................ 455/461; 455/422; 455/433
(58) Field of Search ..................................... 455/433, 435, 455/550, 558, 445, 403, 422, 461, 414; 707/103; 709/213, 218; 370/331, 310, 328

(56) References Cited

U.S. PATENT DOCUMENTS

| 5,291,479 | | 3/1994 | Vaziri et al. . |
| 5,423,060 | * | 6/1995 | Masuda et al. ..................... 455/517 |
| 5,442,683 | * | 8/1995 | Hoogeveen .......................... 455/403 |
| 5,454,032 | * | 9/1995 | Pinard et al. ........................ 379/167 |
| 5,509,053 | | 4/1996 | Gowda et al. . |
| 5,572,528 | | 11/1996 | Shuen . |
| 5,608,447 | | 3/1997 | Farry et al. . |
| 5,615,351 | | 3/1997 | Loeb . |
| 5,659,544 | * | 8/1997 | La Porta et al. ..................... 370/312 |
| 5,764,730 | * | 6/1998 | Rabe et al. ........................... 455/403 |
| 5,825,759 | * | 10/1998 | Liu ....................................... 370/331 |
| 5,915,225 | * | 6/1999 | Mills .................................... 455/558 |
| 5,960,365 | * | 9/1999 | Leih et al. ........................... 455/552 |
| 6,021,331 | * | 2/2000 | Cooper et al. ....................... 455/507 |

FOREIGN PATENT DOCUMENTS 0 684 741 A1    11/1995  (EP) .
95/35611        12/1995  (WO) .

OTHER PUBLICATIONS

Third International Conference on Intelligence in Broadband Services and Networks, Heraclion, Crete Greece, Oct. 16–20, 1995; Anne Clarke, ISBN: 3 540604790, pp. 458–467, "TINA based Advanced UPT Service Prototype".

(List continued on next page.)

Primary Examiner—Nay Maung
(74) Attorney, Agent, or Firm—Nixon & Vanderhye P.C.

(57) ABSTRACT

The present invention relates to an arrangement for improving availability of services in a communications system, especially a telecommunications system, said system comprising distributed hardware and software components which interact in order to provide services to one or more users, and primarily the invention suggests that this improvement can be implemented by introducing in said system a user mobility support, for thereby enabling application availability including personal mobility. More specifically, the present invention suggests the introduction of user mobility support in distributed systems, and specifically by using agent technology which allows modification of internal implementation of agents without effecting the rest of the system.

4 Claims, 16 Drawing Sheets

OTHER PUBLICATIONS

4th International Conference on Intelligence Networks, Nov. 1996, pp. 25–28, Sören Wallinder, "Universal Personal Telecommunication, UPT, Implementation and Base for new Services".

*Teleelektronikk*, 1995, vol. 91, No. 4, pp. 182–184, Geir Olav Lauritzen, "Mobility Applications Integration in Intelligent Networks".

Ericsson telecom AB, Teleia AB, Studenlittertur AB, pp. 290–299, "Att första telecommunikation," 1996, ISBN 91–44–37081–7.

Li et al, Oct. 2, 1996, "A Framework for Universal Personal Computing", IEEE Universal Personal Communications, vol. 2, pp. 769–773.*

Alanko et al, Sep. 4, 1997, "Mowgli: Improvements for Internet Applications Using Slow Wireless Links", IEEE Personal, Indoor, and Mobile Radio Communications, vol. 3, pp. 1038–1042.*

* cited by examiner-

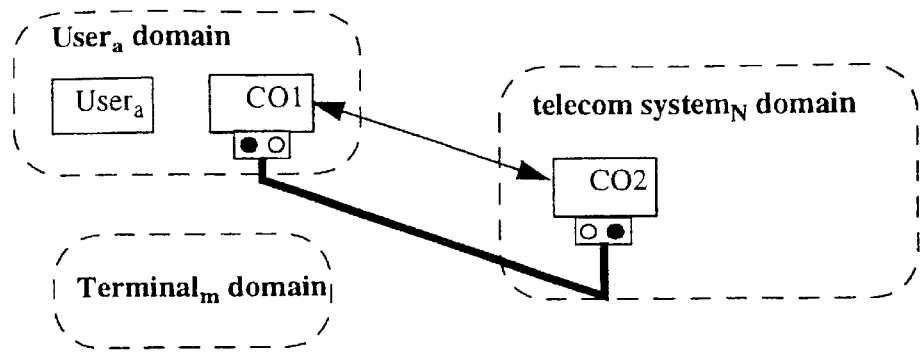
Figure 1  User mobility defined in terms of interactions
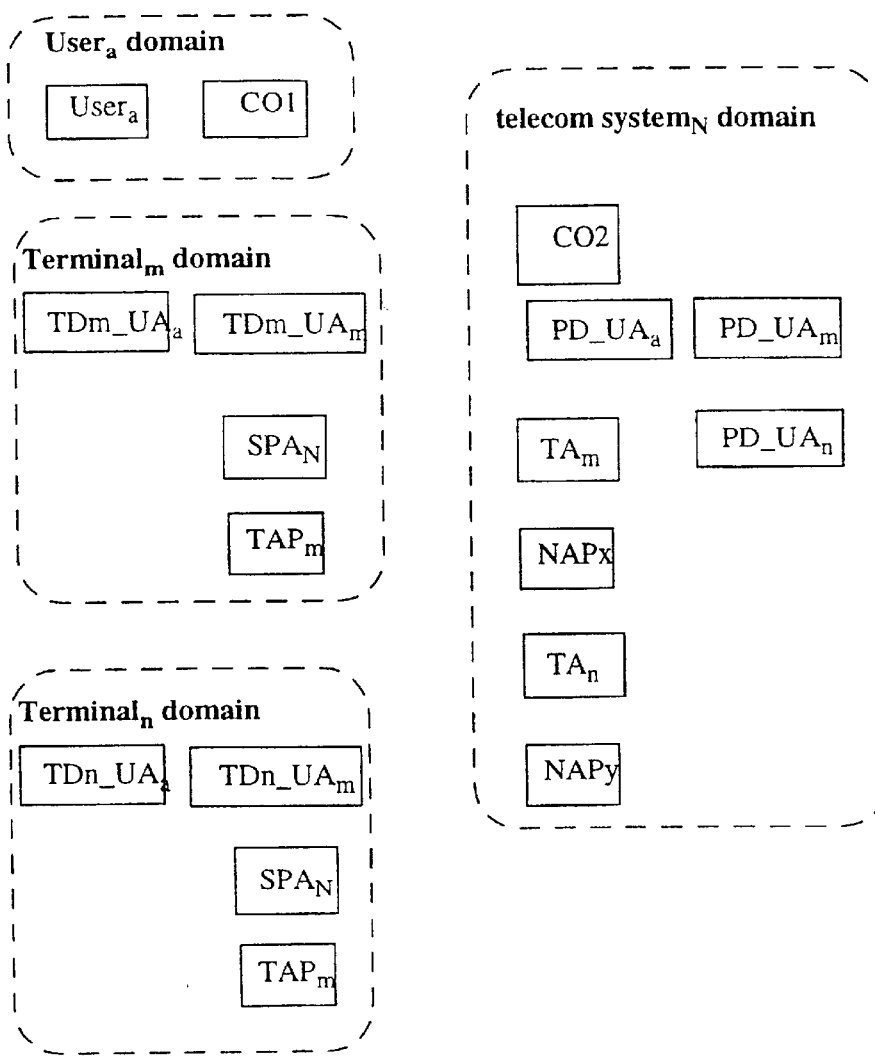
Figure 2  User agents necessary for user mobility support

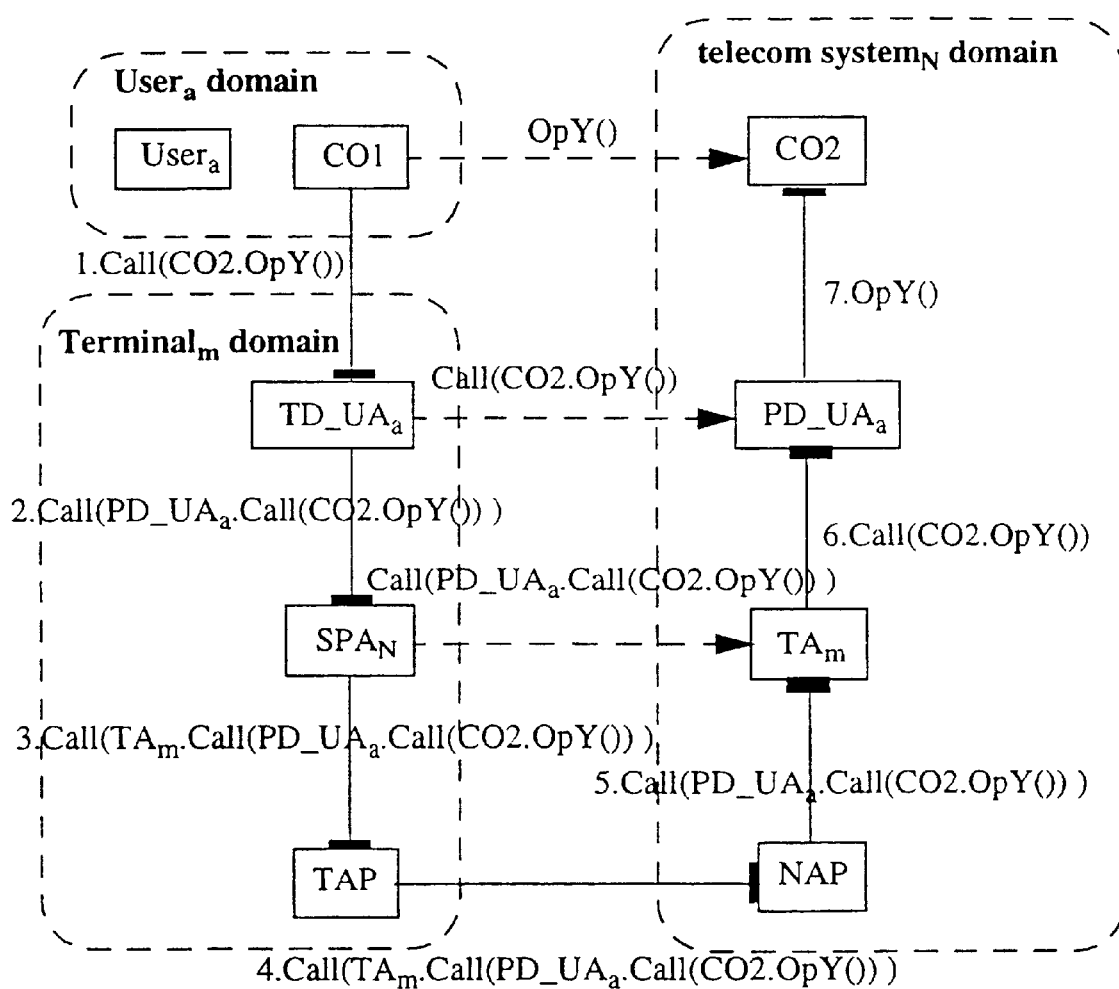
Figure 3    Operations initiated by the mobile user

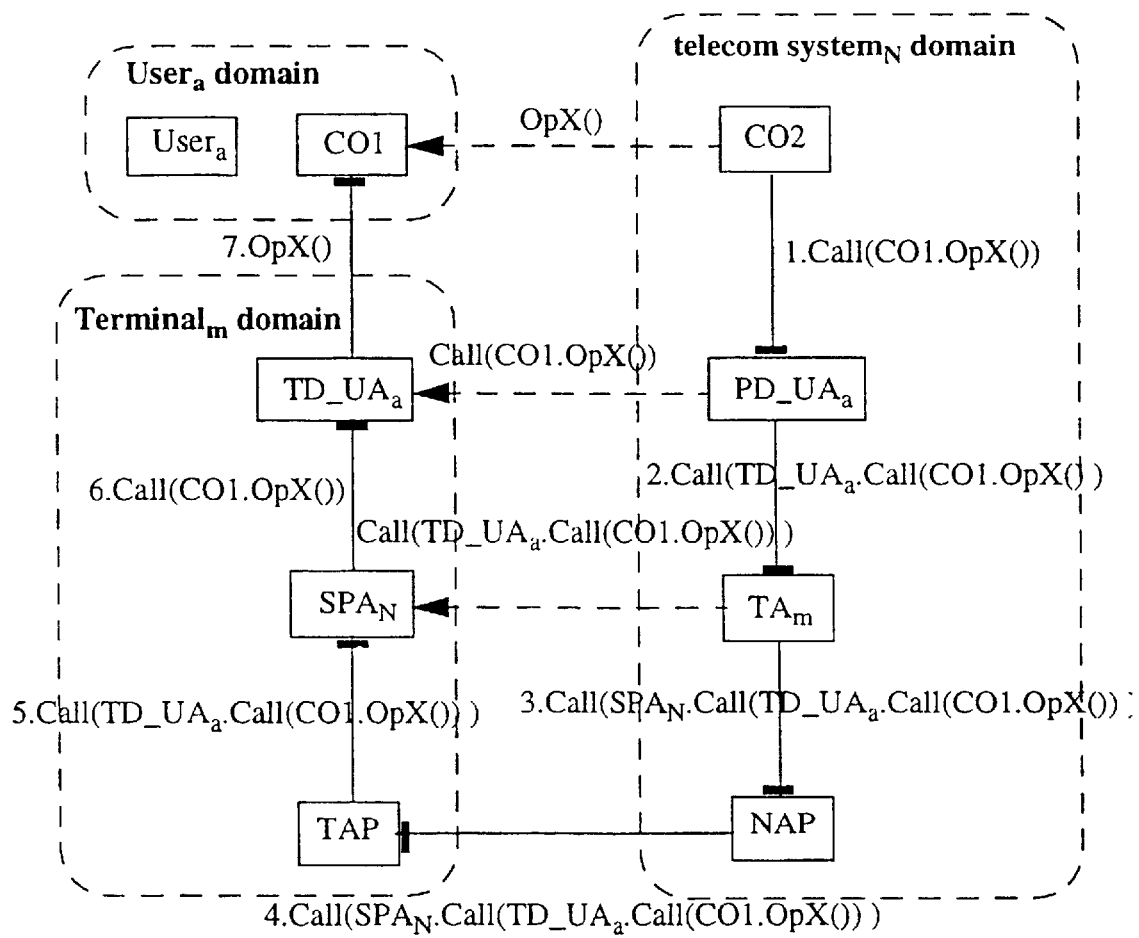
Figure 4   Operations initiated by an object in the telecom system domain

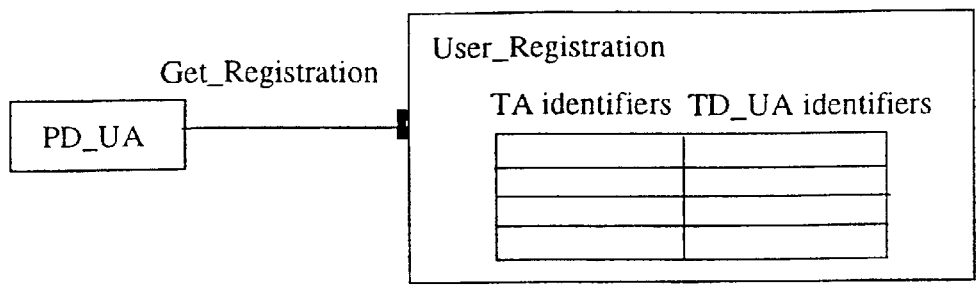
Figure 5   The registration data is stored in a dedicated object User_Registration
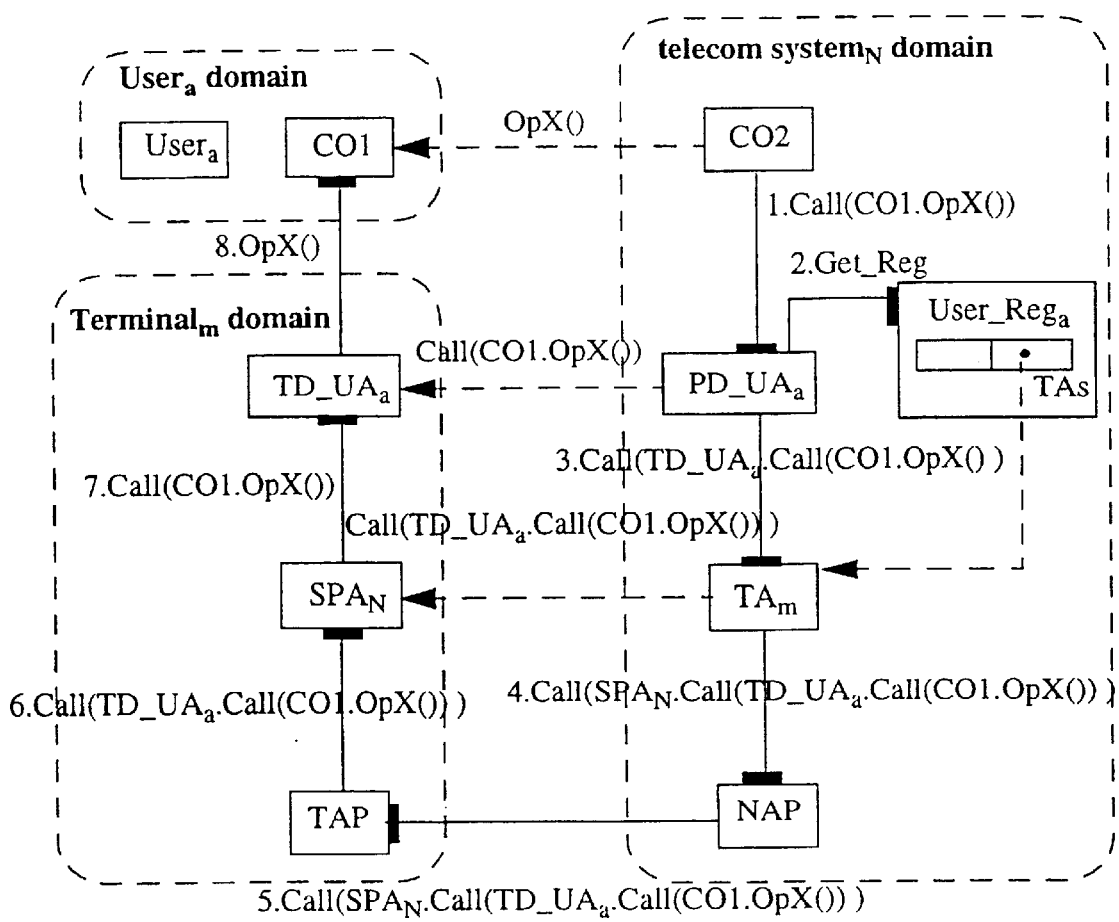
Figure 6   Interactions with the default user domain

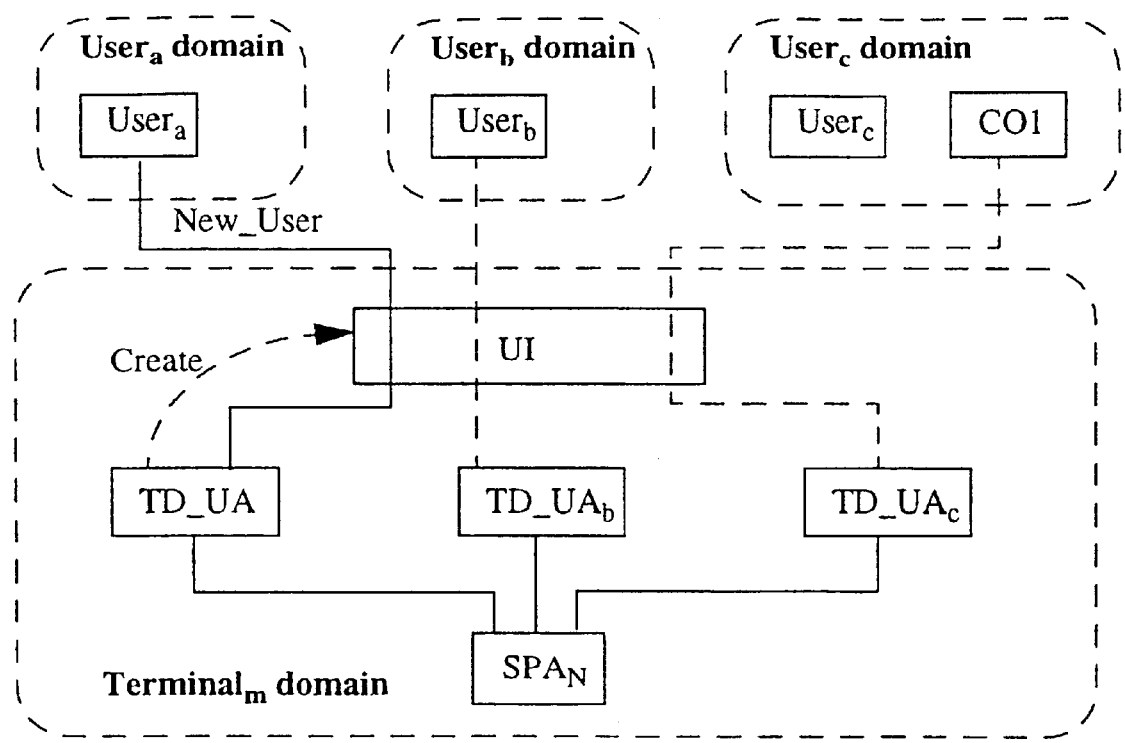
Figure 7    Functionality of the UI object

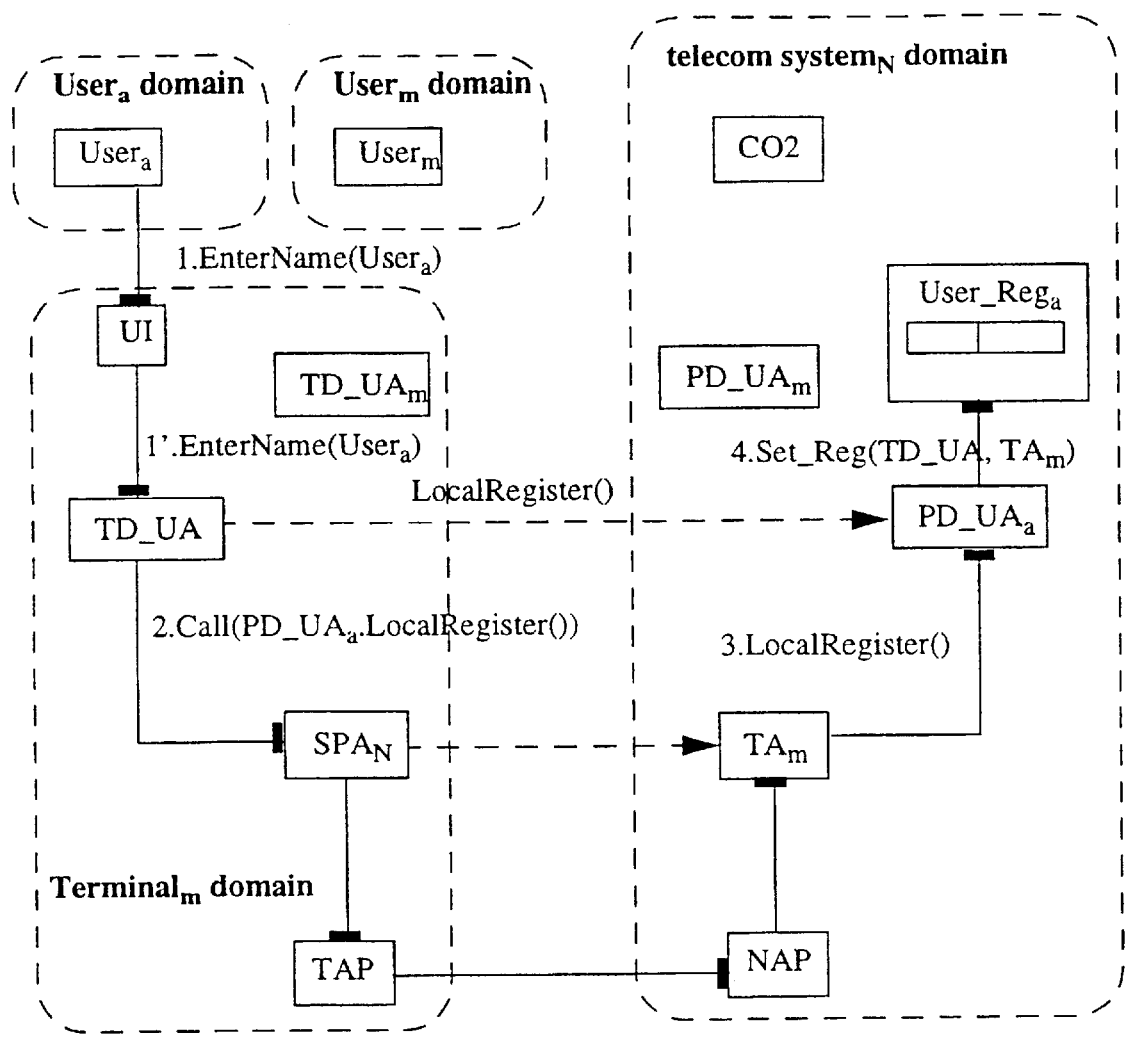
Figure 8    Local registration

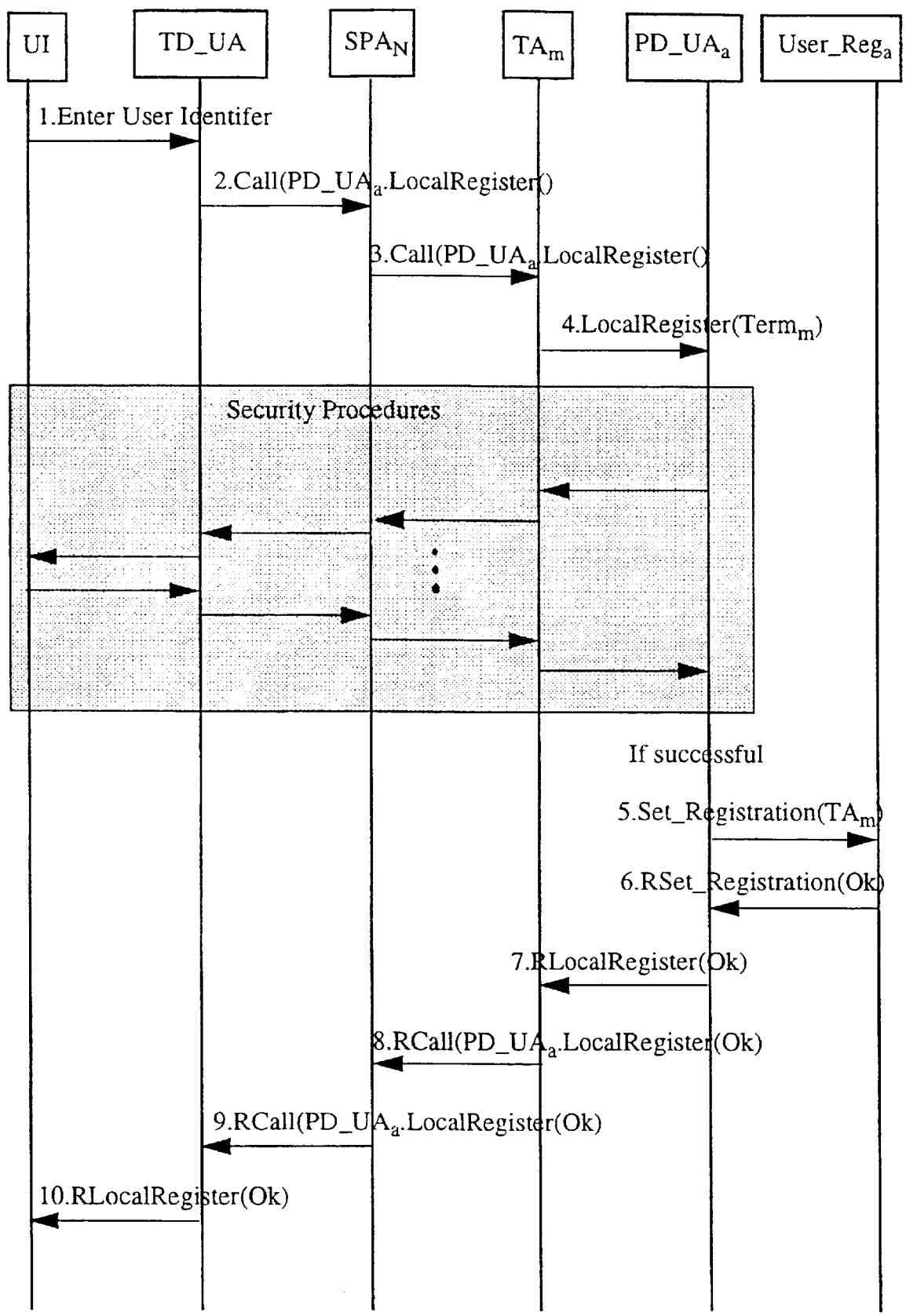
Figure 9     The procedure for the local registration

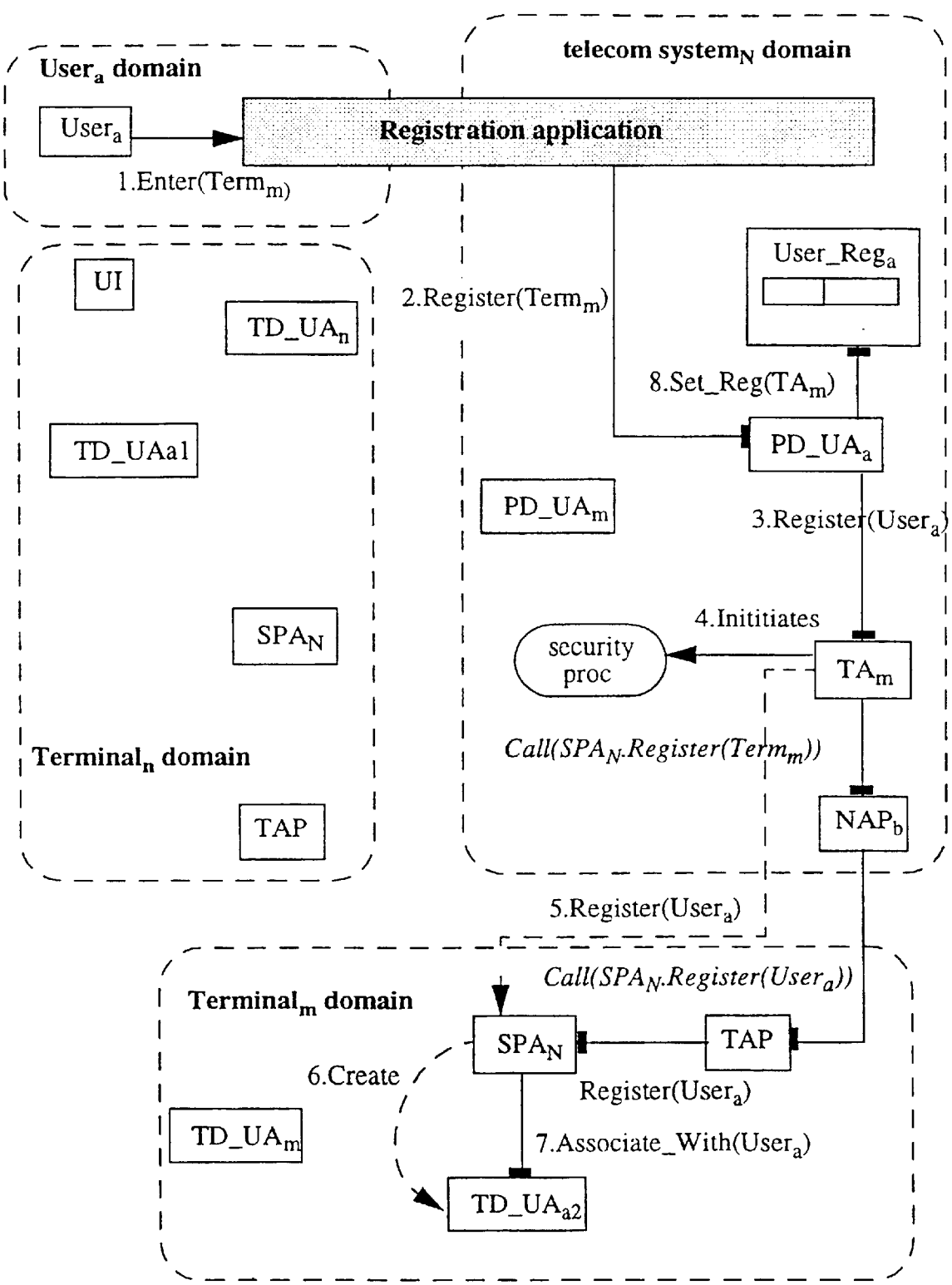
Figure 10     Remote registration

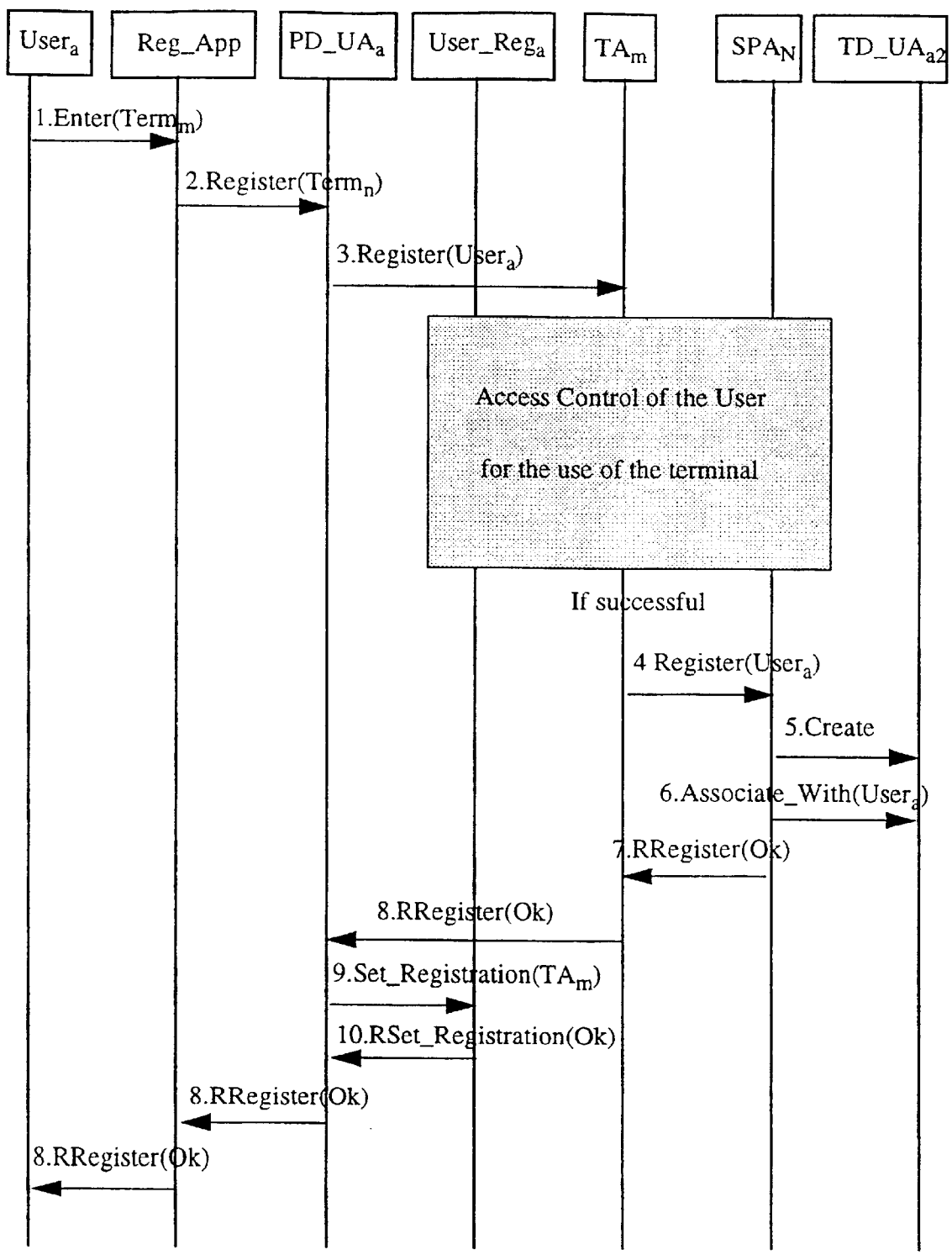
Figure 11    The procedure for the remote registration

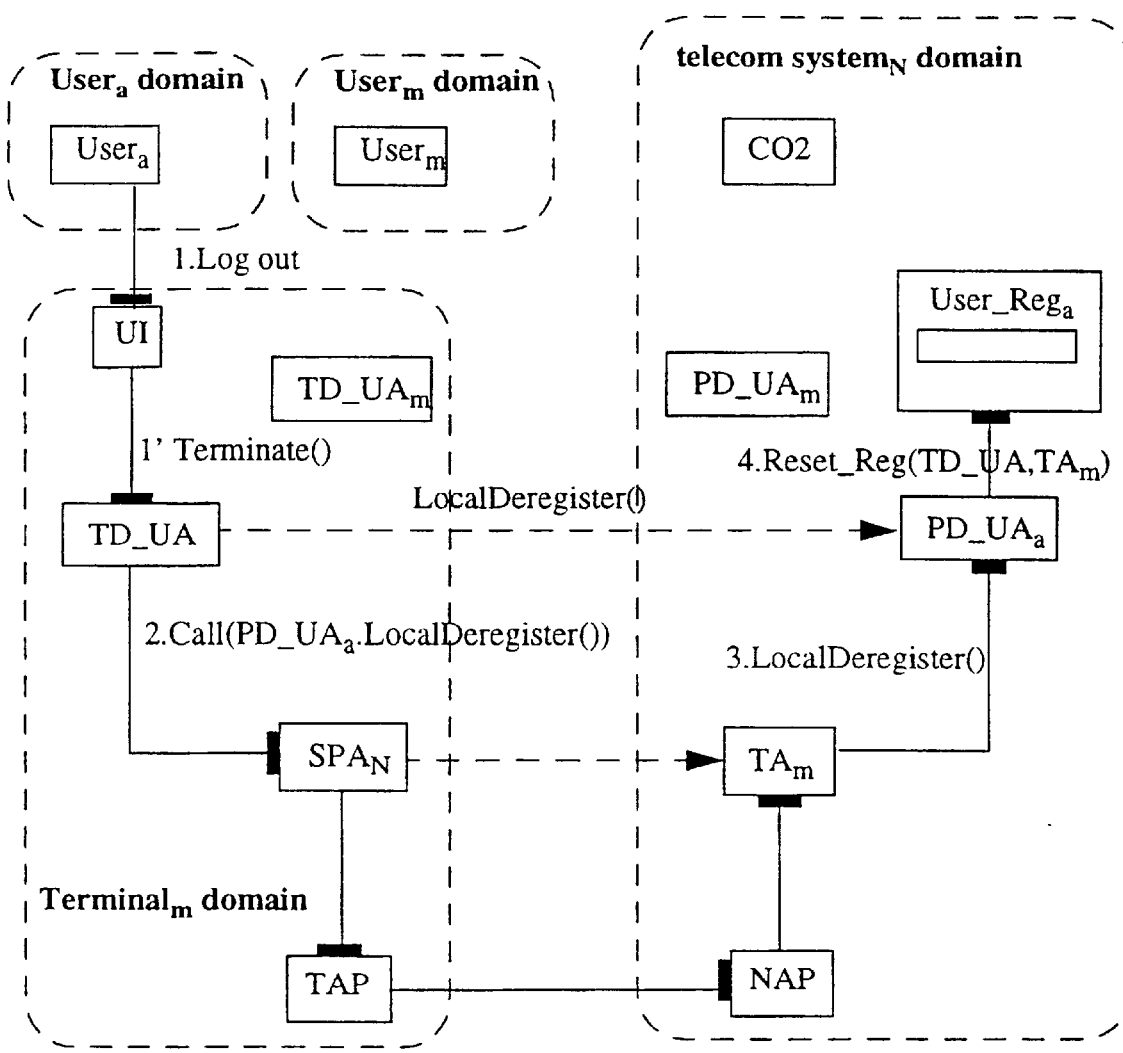
Figure 12  Local deregistration

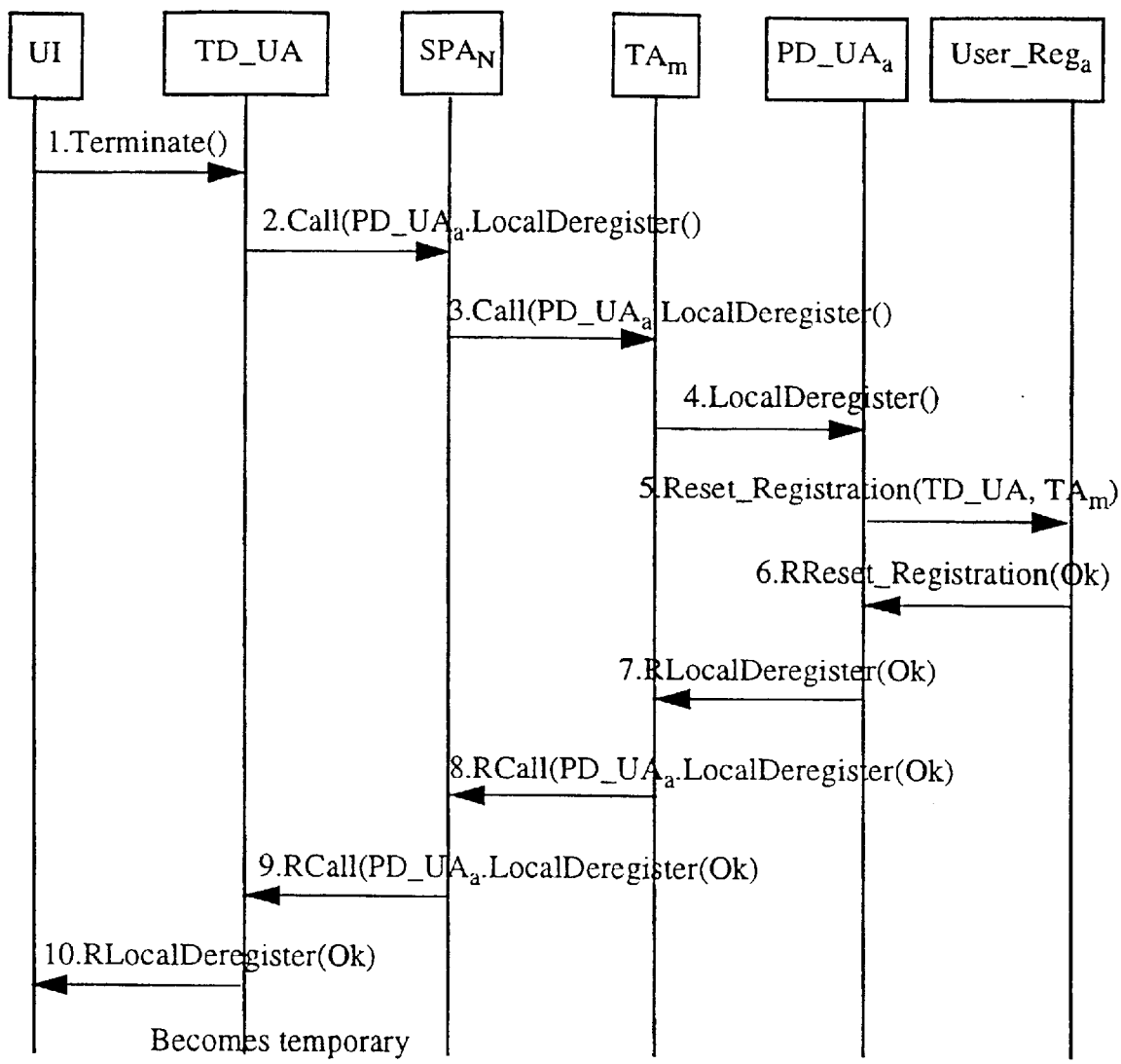
Figure 13 The procedure for the local registration

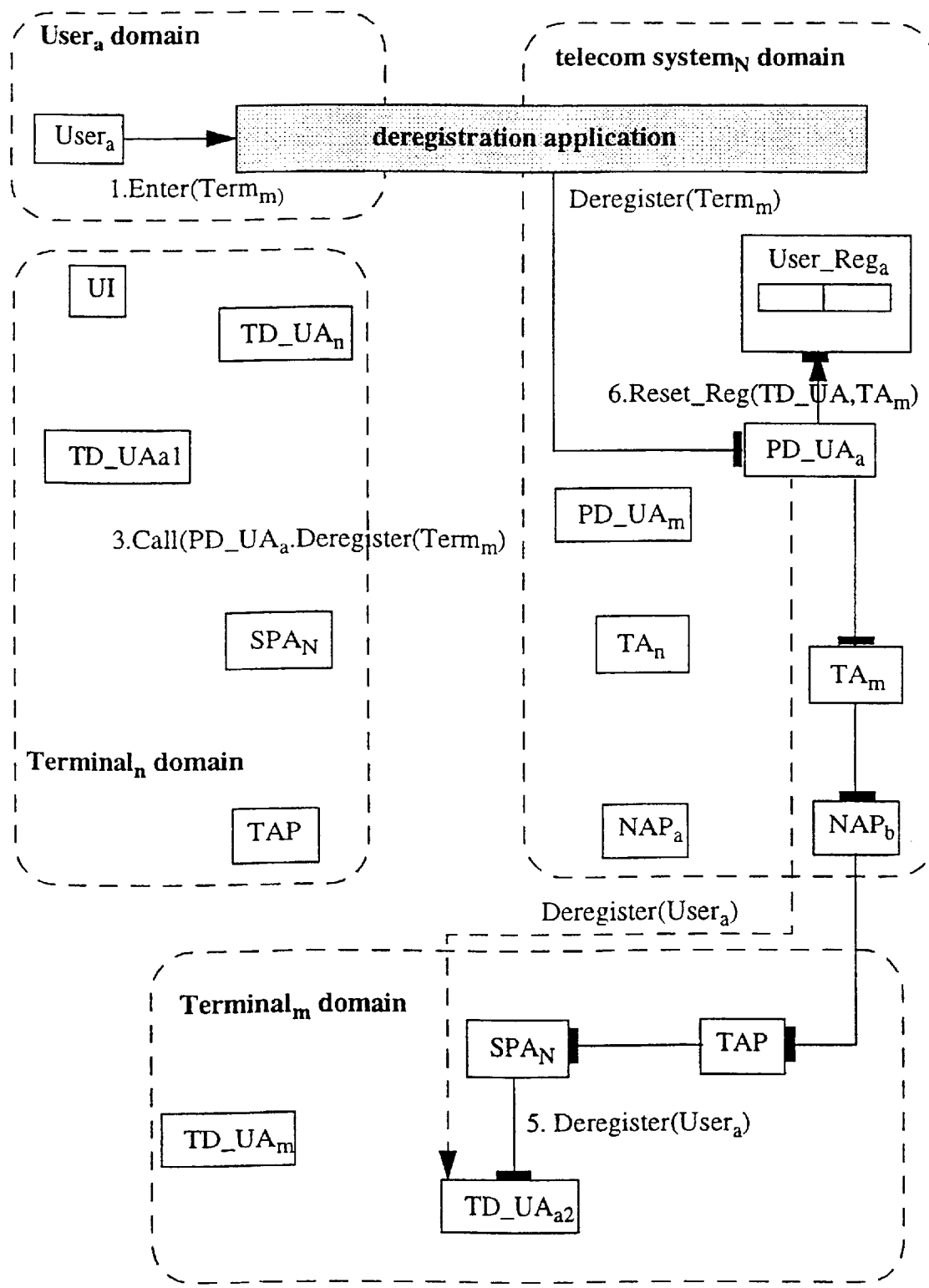
Figure 14    Remote deregistration

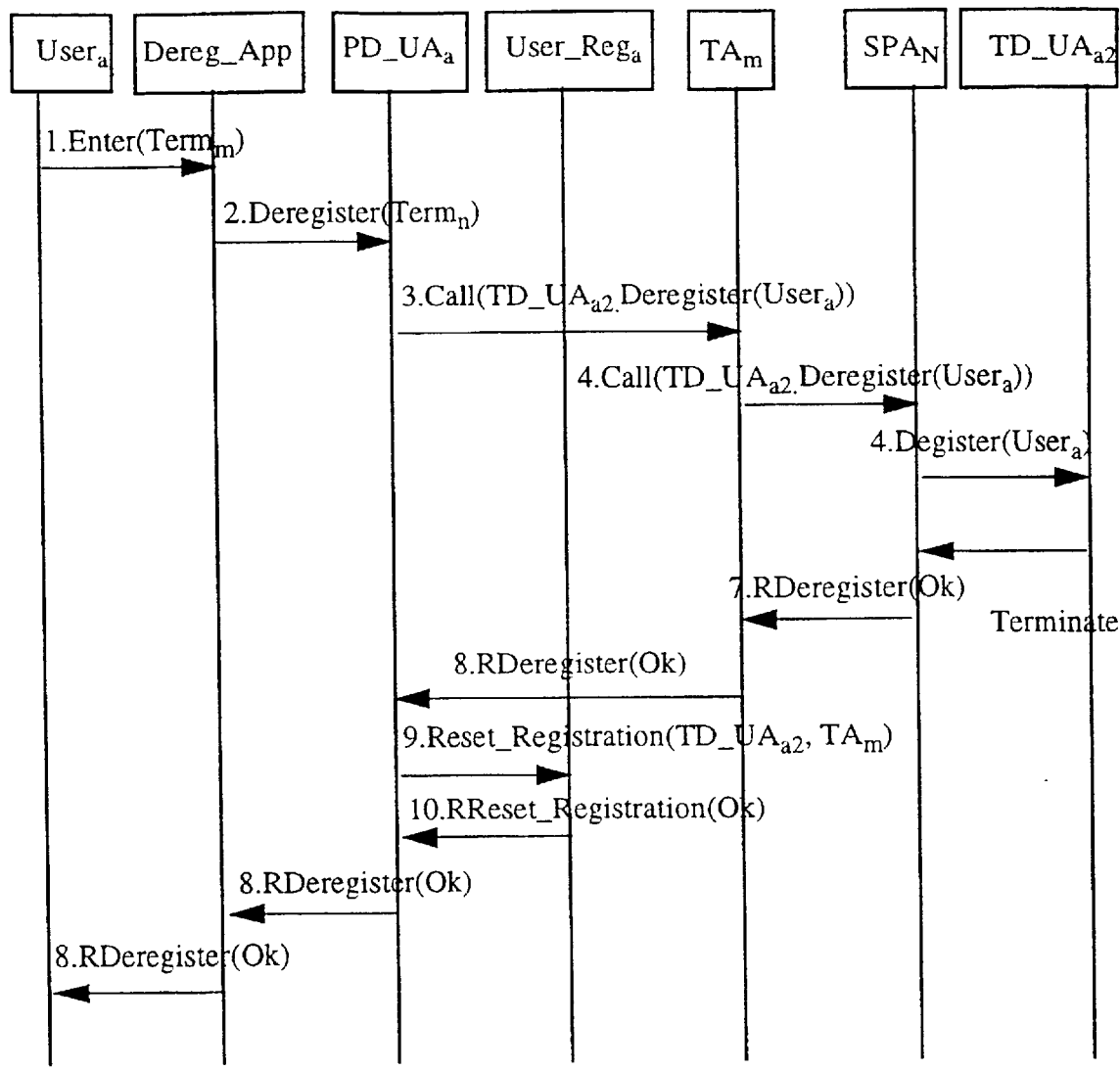
Figure 15 The procedure for the remote deregistration

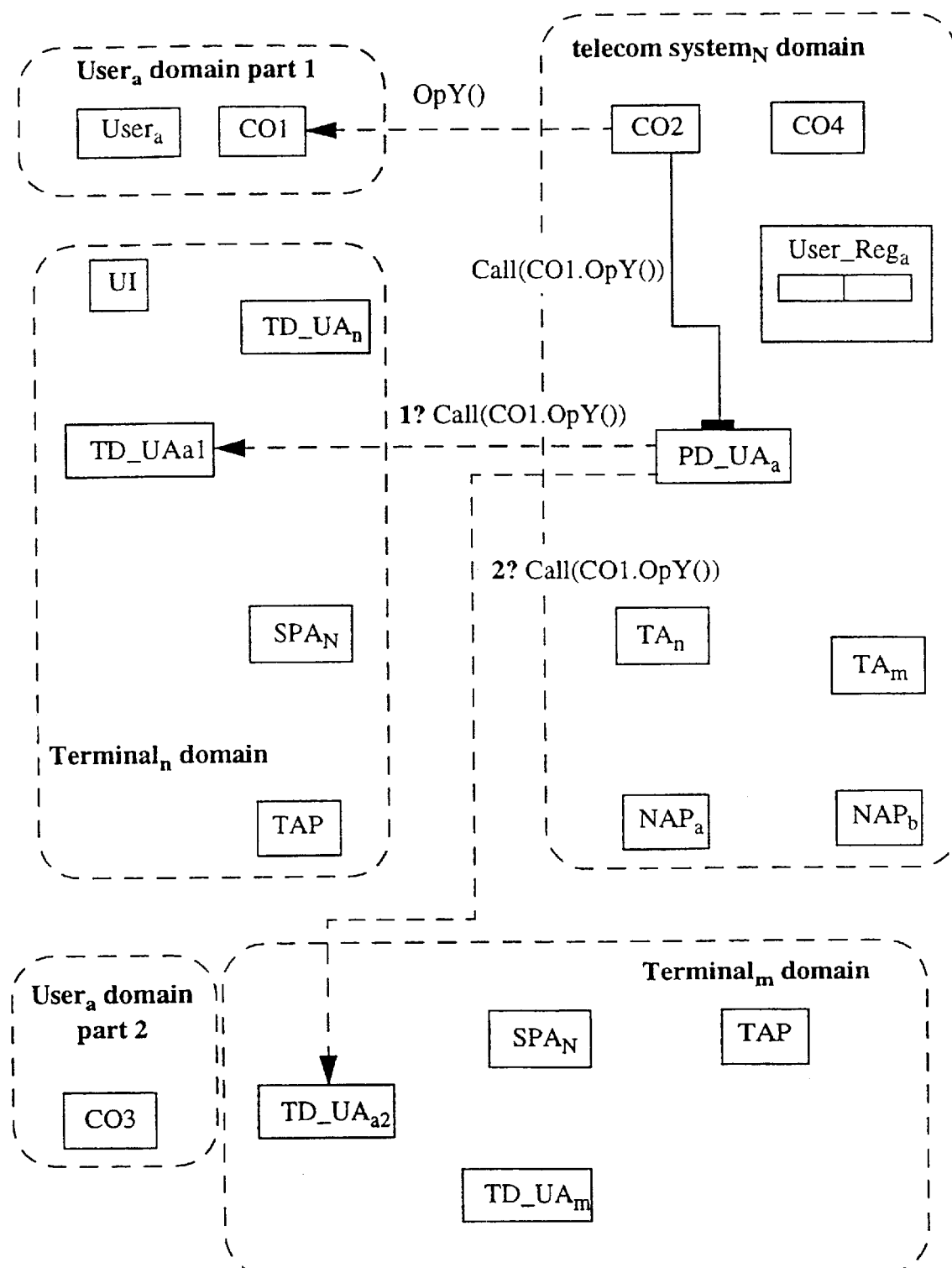
Figure 16  Example of multiple terminal registration

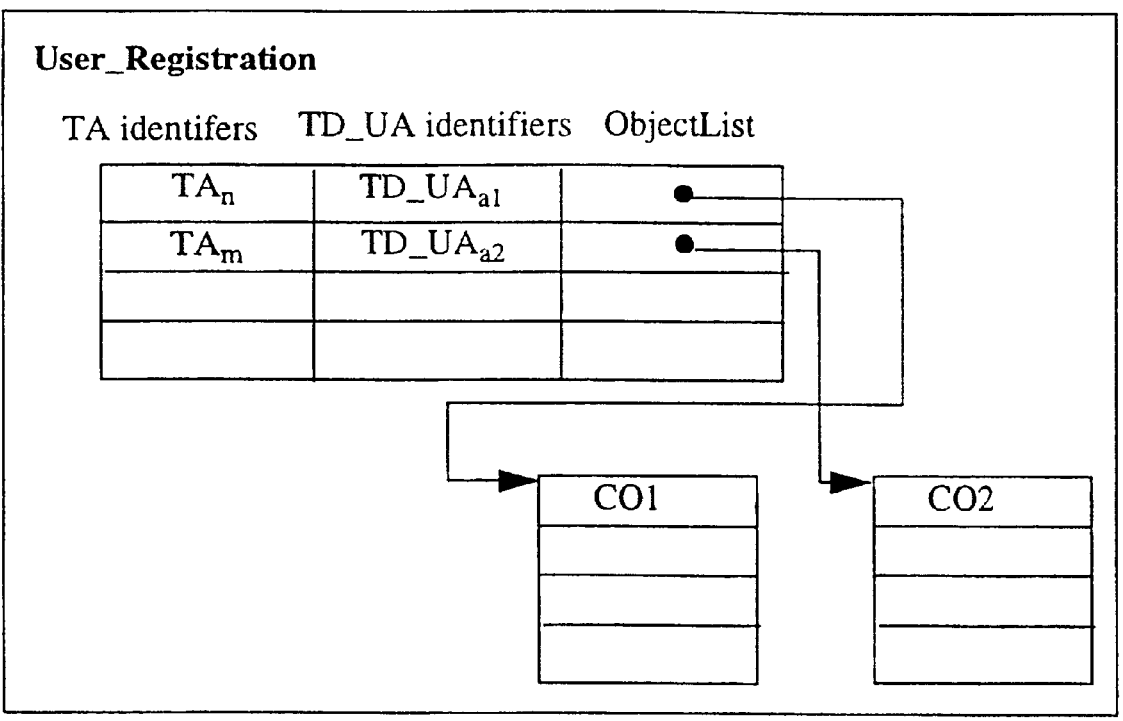
Figure 17   A User_registration object having object registration capability

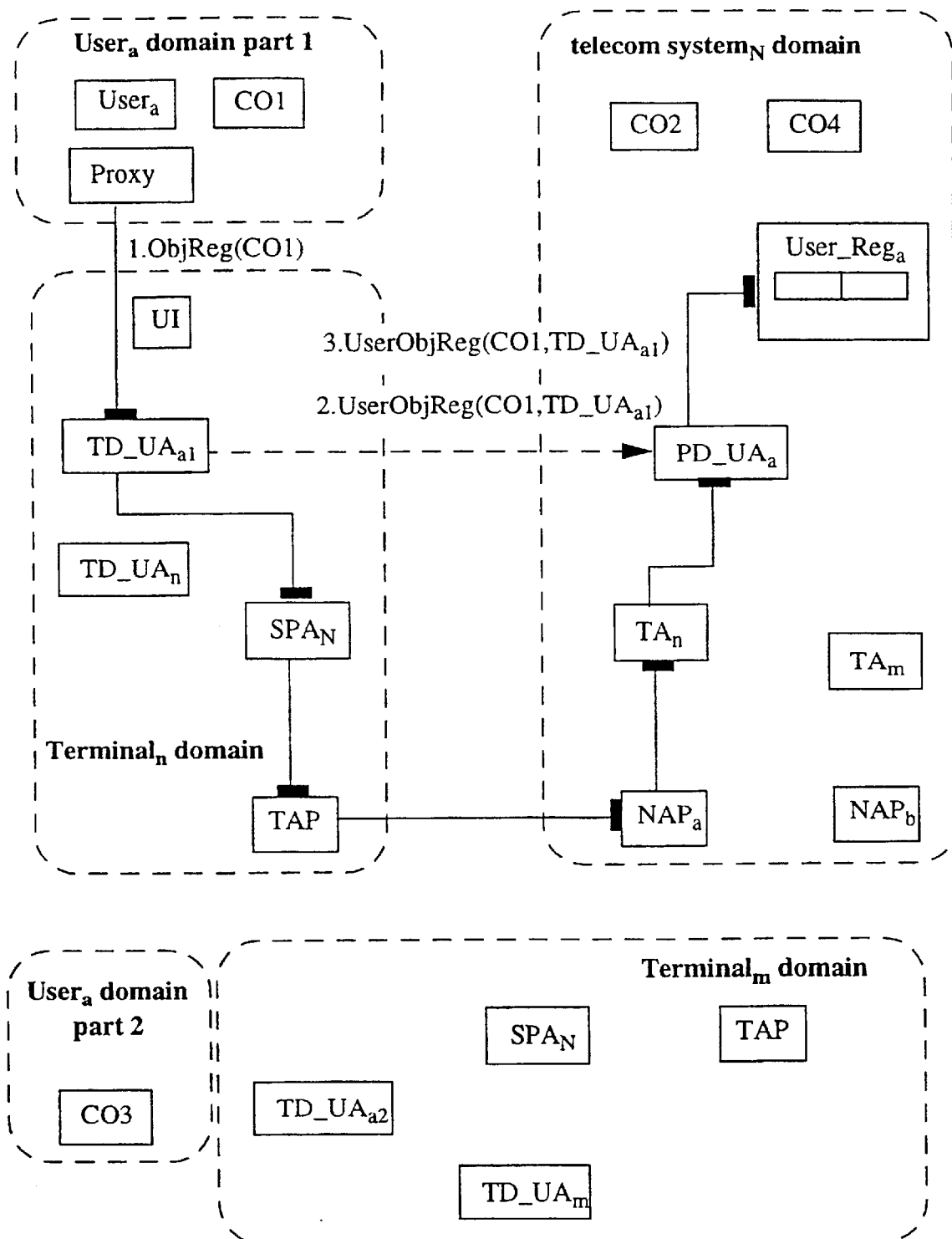
Figure 18     The registration of the user object CO1

ARRANGEMENT FOR IMPROVING AVAILABILITY OF SERVICES IN A COMMUNICATION SYSTEM

This Appln is a con't of PCT/NO98/00108 filed Apr. 2, 1998.

FIELD OF THE INVENTION

The present invention relates to an arrangement for improving availability of services in a communications system, especially a telecommunications system, said system comprising distributed hardware and software components which interact in order to provide services to one or more users.

More specifically the invention concerns the user mobility support in distributed systems.

Still more specifically the invention relates to an improved utilisation of agent technology.

STATE OF THE ART

Open distributed system is a category of distributed systems which are made up of components that may be obtained from a number of different sources, which together work as a single distributed system.

The open distributed system provides an application interface to the distributed system and the application may run on any local operating system which is appropriate. The TINA architecture (Telecommunications Information Network Architecture) is a specialisation of open distributed system for telecommunications applications, and the present invention has primarily been developed in connection with inter alia such TINA architecture.

The TINA-C architecture does address the personal (user) mobility issue, but does not use multiple agents for each user. Further, this architecture does not address the allowance of additional constellations, for example by letting one user using several terminals of same or different capabilities and the allowance of several users using the same terminal.

Besides TINA, there is no architecture addressing user mobility on distributed systems.

Consequently, there exists an increasing demand for user mobility, especially in connection with distributed systems, and hitherto no proper solution for distributed system has been suggested.

OBJECTS OF THE INVENTION

An object of the present invention is to suggest implementations of the improved availability of services in a communication system, especially the user mobility support in distributed systems.

Another object of the present invention is to provide an arrangement allowing a user to move and still allow access to applications/services.

Still another object of the present invention is to provide an improved availability by which one user can use several terminals of same or different capabilities and whereby several users can use the same terminal.

Yet another object of the present invention is to provide an arrangement allowing the separation and protection of objects belonging to different users but running on the same terminal.

A further object of the present invention is to suggest an improved use of multiple agents for each mobile user.

SUMMARY OF THE INVENTION

The above objects are achieved in an arrangement of the type as stated in the preamble, which primarily is characterised by introducing in said system a user mobility support, for thereby enabling application availability including personal mobility.

More specifically the objects are achieved by introducing said user mobility support for distributed system.

Further features and advantages of the present invention will appear from the following description taken in conjunction with the enclosed drawings, as well as from the enclosed patent claims.

BRIEF DISCLOSURE OF THE DRAWINGS

FIG. 1 is a schematical diagram illustrating the user mobility defined in terms of interactions.

FIG. 2 is a schematical diagram illustrating an embodiment of the present invention especially the introduction of user agents necessary for user mobility support.

FIG. 3 is a schematical diagram illustrating operations initiated by the mobile user.

FIG. 4 is a schematical diagram illustrating operations initiated by an object in the telecom system domain.

FIG. 5 is a schematical diagram illustrating a specific embodiment of the present invention comprising a dedicated object user registration means for storing registration data.

FIG. 6 is a schematical diagram illustrating interactions with the default user domain.

FIG. 7 is a schematical diagram illustrating the functionality of the user interface object.

FIG. 8 is a schematical diagram illustrating an embodiment of local registration.

FIG. 9 is a schematical diagram illustrating a procedure for the local registration.

FIG. 10 is a schematical diagram illustrating an embodiment for remote registration.

FIG. 11 is a schematical diagram illustrating a procedure for remote registration.

FIG. 12 is a schematical diagram illustrating an embodiment of local deregistration.

FIG. 13 is a schematical diagram illustrating an embodiment for a procedure for the local registration.

FIG. 14 is a schematical diagram illustrating an embodiment for remote deregistration.

FIG. 15 is a schematical diagram illustrating a procedure for remote deregistration.

FIG. 16 is a schematical diagram illustrating an example of multiple terminal registration.

FIG. 17 is a schematical diagram illustrating an embodiment of a user registration object having object registration capability.

FIG. 18 is a schematical diagram illustrating an embodiment of a registration of a user object.

DETAILED DESCRIPTION OF EMBODIMENTS

Definition of User Mobility

Let us now consider an example consisting of a telecom $system_N$ domain, a $Terminal_m$ domain and a $User_a$ domain. The $User_a$ domain consists of the $User_a$ object and an arbitrary computational object called CO1. Note that the object CO1 may or may not reside physically in the $terminal_m$. In the case where the user is also a terminal or hardware device, CO1 may reside on the user itself and not on the $Terminal_m$ domain.

To offer user mobility means to allow the whole user domain including COi, to move and change terminal and still be able to interact with an object CO2 residing in the telecom system$_N$ domain. By interactions it is meant both operations and stream flows. This is depicted in FIG. 1.

Use of Agents

Let us now introduce the agents necessary to enable interactions between domains. To represent the User$_a$ an agent called PD_UA$_a$ (ProviderDomain_User_Agent$_a$) is introduced in the telecom system$_N$ domain. This agent assumes security functions such as identification, authentication, encryption, etc. and is also responsible for the functions supporting the mobility of the user. Another agent called TDm_UA$_a$ (TerminalDomain_User_Agent$_a$) is introduced in the Terminal$_m$ domain to represent the User$_a$ and to assume the security functions of the Terminal$_m$. If the User$_a$ is also using another terminal, namely Terminal$_n$ then a TDn_UA$_a$ is also defined for him on the Terminal$_n$ domain.

We assume further that every terminal must have an owner and it is reasonable to define this owner as the default user of the terminal. A legal and operative terminal will always have a default user. This default user is permanently registered at the terminal. Definition of a default user for a terminal allows us to implement access control procedures which may restrict the usage of the terminal. Of course, the default user can also be registered at another terminal but the former registration is always valid and we have a multiple terminal registration case. There is therefore introduced in the Terminal$_m$ domain an agent TD_UA$_m$ representing the default user. Correspondingly, an agent PD_UA$_m$ is introduced in the telecom system$_N$ domain.

In addition, we have objects such as SPAN representing the telecom system$_N$ domain in the Terminal$_m$ domain, TAm representing the Terminal$_m$ in the telecom system$_N$ domain, TAP representing a Terminal Access Point (port), NAP representing a Network Access Point. This is depicted in FIG. 2.

Enabling Operations Between the Mobile User and the Telecom System

Since operations can be initiated either by the User$_a$ or by objects in the telecom system$_N$ domain, we will consider the two cases separately.

Operations Initiated by the Mobile User

Suppose now that CO1 wants to invoke an operation OpY( ) on the object CO2. The invocation is not done directly.

First, an operation Call(CO2.OpY( )) is issued to the object TD_UA$_a$. This shows that there must be an association between CO2 and TD_UA$_a$. The definition of this association will be discussed later. The TD_UA$_a$ will then invoke the operation Call(O2.OpY( )) on its peer-object PD_UA$_a$. What TD_UA$_a$ needs in order to issue the operation request is the identifier of the object PD_UA$_a$. Since both TD_UA$_a$ and PD_UA$_a$ represent the same user and there is only one unique PD_UA$_a$, it is not a problem for TD_UA$_a$ to find the identifier of PD_UA$_a$. Indeed, both of these two objects hold the identity of the user whom they represent.

The operation Call(O2.OpY( )) on PD_UA$_a$ is converted to an operation Call(PD_UA$_a$.Call(CO2.OpY( ))) of the SPAN. The SPAN issues a operation request Call(PD_UA$_a$.Call(CO2.OpY( ))) on its peer-object TA$_m$. This request is converted to the operation Call(TA$_m$.Call(PD_UA$_a$.Call(CO2.OpY( ))) on the TAP. The TAP will then forward this operation to the NAP to which it is currently connected with. The NAP will then issue an operation request Call(PD_UA$_a$.Call(CO2.OpY( ))) to the TA$_m$. The TA$_m$ will then invoke Call(CO2.OpY( )) of the PD_UA$_a$.

The PD_UA$_a$ will now call the operation OpY( ) of the object CO2. This concludes the conveyance of the operation OpY( ).

The invocation of operations by objects in the user domain are seamless supported. The only information required by the user domain is that CO2 is residing on the fixed kTN (or located in the telecom system domain). No additional information is required. This is depicted in FIG. 3.

Operations Initiated by an Object in the Telecom System Domain

Reference is made to FIG. 4.

Suppose now that an object CO2 in the telecom system domain wants to invoke the operation OpX( ) of Col. This operation will be converted to the operation Call(CO1.OpX( )) of the PD_UA$_a$. In order to make the conversion possible the information that CO1 belongs to the User$_a$ domain and not to any other user domain, must be available in the telecom system domain.

The PD_UA$_a$ will then invoke the operation Call (CO1.OpX( )) on the object TD_UA$_a$. The first requirement is to find the identifier of TD_UA$_a$. For the time being we just suppose that such information is available. We shall soon come back to how it can be found. The operation request is thereafter converted to the operation Call(TD_UA$_a$.Call(CO1.OpX( )) on the TA$_m$. To be able to do that, the PD_UA$_a$ must have the identifier of TA$_m$ or the identity of the terminal, namely Terminal$_m$ where the User$_a$ is located.

The procedure to acquire the necessary information to reach the mobile user is commonly known as location tracking and is often supplemented by a location registration and deregistration procedure.

Let us suppose for the time being that the PD_UA$_a$ somehow gets sufficient information and calls the correct Terminal_agent, namely TA$_m$. From this step to step 6, all the operations are related to the handling of terminal mobility. The TA$_m$ will transfer the call to its peer-to-peer object SPAN by issuing the operation Call(SPAN.Call(TD_UA$_a$.Call(CO1.OpX( )) to the NAP. The NAP transfers the call to the corresponding TAP. The TAP invokes then the operation Call(TD_UA$_a$.Call(CO1.OpX( ))) of the SPAN. The SPAN calls the operation Call(CO1.OpX( )) of the TD_UA$_a$. Finally, the TD_UA$_a$ invokes the operation OpX( ) of the object CO1. This concludes the convey of an operation initiated by an object in the telecom system domain.

We have seen that the condition for the success of these procedures is the availability of information about the current terminal which the user is using or having access to. Formally speaking, the success of operations initiated by objects.residing on the telecom system domain depends on the definition of the association between the PD_UA$_a$ and a TA.

When the User$_a$ is moving, the association between PD_UA$_a$ and TA is changing correlatively and may sometimes be undefined. The operations necessary to determine this association are parts of the procedures commonly referred to as user registration and deregistration.

User Location Registration and Deregistration

The user location registration and deregistration is the procedure to determine the association between the PD_UA and the TA. There are many methods that will be described in the following sections.

The "On-the-Fly" Method

The most straightforward method is the "on-the-fly" method. This method can also be called "lazy" since nothing is to be done unless it is necessary, e.g. a request is issued. When an object CO2 residing in the telecom system domain wants to call an operation of an object CO1 belonging to the $User_a$ domain, a request is issued to the $PD\_UA_a$ object. The $PD\_UA_a$ object will issue a broadcast to all the TAs asking them to search for the mobile user. The TAs can ask their counterpart, namely the SPA, to search for the corresponding $TD\_UA_a$. If none of the SPAs succeed, then the $User_a$ cannot be reached. Nothing else can be done. If one SPA succeeds in finding the mobile $User_a$, it will answer to the corresponding TA which again informs the $PD\_UA_a$. Then the $PD\_UA_a$ can send the operation invocation to the TA in question which forwards it to the corresponding SPA. The SPA forwards the operation to the $TD\_UA_a$ object which delivers it to the object CO1. Interactions are then enabled.

This method is acceptable for small and "less geographically distributed" system, i.e. system with small number of terminals and small number of users. It can be time consuming for larger or more geographically distributed systems. It may take a while to find the user or to know that it is not possible to find him. This method requires also much activity in the telecom system domain. If there are n terminals and m users in the system, then, in the worst case, m×n search procedures can be initiated simultaneously to find all the m users. This method is used in Internet when a search engine is used to identify the location of another web page or place of information.

Method Based on the Predetermination of the Association Between the PD_UA and the TA There is another method based on the predetermination of the association between the PD_UA and the TA. The PD_UA knows in advance whether the mobile user has contact with any TA or not, and which specific TA instance it is associated with. In other words, the PD_UA object has the ability to store the association between the PD_UA and the TA.

A simple implementation is to use a TA identifier which is a kind of "distribution transparent" pointer to a TA. By this method, much time will be saved at run-time when an operation request is issued.

The TA identifier does not necessarily have to be incorporated inside the PD_UA but can be realized as a separate computational object, say User_Registration offering registration information service to the PD_UA object. The User_Registration object may contain several TA identifiers since a user may be allowed to use several terminals at the same time.

The second piece of information required is the identifier of the corresponding TD_UA. Although this information can be deduced from the identity of the user and the identity of the terminal, it is more convenient to store it. The less the processing required at run-time, the shorter response time will be obtained. A User_Registration object containing a information about the TD_UAs and the TAs is shown in FIG. 5.

The questions now are: how can the PD_UA get the information about the TD_UAs and the TAs and when should the up dating be done to ensure consistency with the real movements of the user?

Default Registration

As mentioned earlier, every terminal is associated with a default user who is the owner of the terminal. In this case, the association between the PD_UA and the TA is always defined. We can refer to this as default registration.

Let us consider again the example where an object CO2 wants to invoke the operation OpX of an object CO1 belonging the $User_a$ domain. Let us suppose now that the $User_a$ is the default user of the $Terminal_m$. When receiving the operation request Call(CO1.OpX( )), the $PD\_UA_a$ call the operation Get_Registration ( ) of the User_ $Registrations_a$. The $User\_Registration_a$ checks its TD_UA and TA table and return the identifiers of the default TD_UA and the TA, namely $TD\_UA_a$ and $TA_m$ to PD_UA. The $PD\_UA_a$ proceeds to call the operation Call($TD\_UA_a$.Call (CO1.OpX( )) on the $TA_m$ object. The procedure will continue as described earlier until the whole operation OpX is accomplished. This is depicted in FIG. 6.

Local Registration

The local registration is the case where a $User_a$ wants to use a $Terminal_m$ belonging to a $User_m$. Actually the local registration belongs to the Access Session which purpose is to enable the user to access services.

Before continuing, some requirements have to be imposed on the terminal. In order to allow several users to use the same terminal to access the telecom system domain, the terminal must have some more local "intelligence", i.e. more processing and storage capability than the current terminal used in the fixed network. We introduce an object called UI (User_Interface) in the $Terminal_m$ domain. This object is responsible for the supervision and control of interactions between the terminal and the users. UI has the functionality to switch between different users in the case where several users share the same terminal. Upon request, UI can also create new TD_UA object to serve new arriving user.

In FIG. 7 we show an example with three users. $User_b$ and $User_c$ are already registered at $Terminal_m$. Upon request, UI can switch between these two users, i.e. connecting the input/output channel respectively to $TD\_UA_b$ or $TD\_UA_c$. The switch request can be realised in different ways such as entering command New_User( ), depressing a key or by using a mouse to click on an icon, etc.

When $User_a$ arrives and wants to use the terminal he/she can issue a request New_User. The UI can create a new and "temporary" TD_UA object. By temporary it is meant that this TD_UA is not yet associated with any user or more specific to any PD_UA which is known and recognisable for the telecom system domain. The association will only be done after the local registration has been accomplished successfully. The UI will also connect the input/output channel to this TD_UA. The $User_a$ can now interact with the temporary TD_UA.

Let us now return to our example. The $User_a$ wants to register himself at the $Terminal_m$. After calling the operation New_User( ) and getting a temporary TD_UA assigned to him, the $User_a$ enter his User Identifier (or name) to the temporary TD_UA (see FIG. 8).

From the User Identifier the temporary TD_UA deduces the Computational Interface Identifier (CII) of the corresponding $PD\_UA_a$ knowing that the operation LocalRegister( ) has to be invoked on that $PD\_UA_a$. The temporary TD_UA invokes therefore the operation Call (PD_UAa.LocalRegister( )) on the SPAN, to start the convey of the operation LocalRegister( ). The invocation is conveyed through the TAP, NAP and arrives at $TA_m$. The $TA_m$ will then invoke the LocalRegister( ) operation on the $PD\_UA_a$. The $PD\_UA_a$ will start the security procedures. As shown in FIG. 9, we assume now that the security procedures are successful. The $PD\_UA_a$ will call the operation Set_Registration(TD_UA, $TA_m$) on the $User\_Reg_a$ which saves the identifiers of the TD_UA and $TA_m$. The $PD\_UA_a$ will answer back to the TD_UA with a status Ok. The TD_UA will save the identifier of $PD\_UA_a$ and becomes a permanent agent associated to $User_a$. The TD_UA will remain alive until an eventual deregistration of the User$_a$ for Terminal$_m$.

Remote Registration

The remote registration is the case where a User$_a$ wants to run or receive an application on a remote Terminal$_m$ where he has not logged in. User$_a$ is actually logged in at a Terminal$_n$. In order to perform a remote registration User$_a$ must have a registration application running on Terminal$_n$. A registration application is a special outgoing application which allows the registration for the delivery of application. The design of the registration application falls, however, beyond the scope of this document.

Let us for the time being assume that the Registration application allows User$_a$ to enter the identity of the wanted remote terminal, namely Terminal$_m$.

The Registration application will then invoke Register (Term$_m$) on the PD_UA$_a$.

The PD_UA$_a$ will invoke the operation Register(User$_a$) on TA$_m$, the terminal agent of Terminal$_m$. Here again, before granting the registration, the TA$_m$ initiates the access control of the user for the use of the terminal to check whether User$_a$ is allowed to register himself at Terminal$_m$ for example to protect the privacy of the terminal owner. If the User$_a$ is not allowed, TA$_m$ returns a NotAllowed status in the response to PD_UA$_a$ which informs the registration application. The registration application will then deliver a NotAllowed message to the User$_a$.

Let us assume that the access control is successful. The TA$_m$ will invoke the operation Register(PD_UA$_a$) on its counterpart SPAN. As usual, the operation invocation must of course be conveyed through the NAP and TAP.

In FIG. 10, we present briefly some operations belonging to the terminal mobility support in italics in order not to burden our explanation.

Upon receipt of the call, the SPAN will create a TD_UA$_{a2}$ and invoke the operation Associate_with (PD_UA$_a$) on the TD_UA$_{a2}$ causing the saving of the identifier of PD_UAa. The TD_UA$_{a2}$ will then persist until a deregistration for Terminal$_m$. The SPAN will return an Ok status and the identifier of TD_UAa2 to the TA$_m$ which also returns the same information to the PD_UA$_a$.

The PD_UA$_a$ will then call the operation Set_Registration(TD_UA$_{a2}$,TA$_m$) on the User_Reg$_a$ which saves the identifiers of TD_UA$_{a2}$ and TA$_m$. The PD_UA$_a$ returns then an Ok status to the Registration application. The Registration application delivers an Ok Status to the User$_a$ at Terminal$_m$. This completes the remote registration. The procedure for remote registration is shown in FIG. 11.

Local Deregistration

When the user wants to terminate all his activities at a terminal, he can just log out from this terminal. The deregistration is initiated locally from the same terminal.

Let us consider the example shown in FIG. 12. A User$_a$ registered at the Terminal$_m$ wants to log out. He terminates his access session (see Paragraph 9.4) which results in a termination request to the TD_UA. Before terminating, the TD_UA invokes the operation LocalDeregister( ) on the PD_UA$_a$. The operation request is converted into the operation Call(PD_UA$_a$.LocalRegister( ) on the SPAN. The operation is conveyed through the TAP, NAP and arrives at TA$_m$. The TA$_m$ will then invoke the operation LocalDeregister( ) on the PD_UA$_a$. The PD_UA$_a$ will invoke the operation Reset_Registration(TD_UA,TA$_m$) of the User_Rega which removes the identifiers of the TD_UA and TA$_m$ from its internal table. The PD_UA$_a$ will return to TD_UA a status Ok. The TD_UA can now terminate itself. The procedure for local deregistration is shown in FIG. 13.

Remote Deregistration

To terminate all his activity at a terminal, the user can also initiate the deregistration remotely from another terminal. Let us consider the example where a User$_a$ wants to deregister himself at a Terminal$_m$ belonging to a User$_m$ (the default user), from another terminal, namely Terminal$_n$.

In order to do such deregistration User$_a$ must have access to a deregistration application running on Terminal$_n$ so that he can enter the identity of the remote terminal he wants to deregister from. The deregistration application will then invoke the operation Deregister(Term$_m$) on the PD_UA$_a$ object.

The PD_UA$_a$ will call the operation Deregister(User$_a$) on the TD_UA$_{a2}$, the terminal domain user agent on Terminal$_m$ assigned to User$_a$. This operation is shown by a dotted arrow in FIG. 14. Physically it is converted to an operation on the TA$_m$ and then conveyed via the NAP, TAP, SPAN before arriving at TD_UA$_{a2}$. The TD_UA$_{a2}$ object will remove the identifier of the PD_UA$_a$, return an Ok status to the PD_UA$_a$ object and terminate itself. The PD_UA$_a$ object will call the operation Reset_Registration(TD_UA$_{a2}$, TA$_m$) on the User_Rega object causing the removal of the identifiers of the TD_UA$_{a2}$ and TA$_m$ from its internal table. Upon receipt of an Ok status, the PD_UA$_a$ object can return the Ok status to the deregistration application which may forward it to User$_a$. This completes the remote deregistration. The procedure for deregistration is shown in FIG. 15.

Supporting Multiple Terminal Registration

As stated earlier, a user must be allowed to register at and use several terminals at the same time.

To clarify the situation, let us consider the example shown in FIG. 16. A User$_a$ is registered at two terminals Terminal$_n$ and Terminal$_m$ and is associated with two terminal agents TD_UA$_{a1}$ and TD_UA$_{a2}$ respectively. He has two computational objects CO1 and CO3 running on Terminal$_n$ and Terminal$_m$ respectively. CO1 is interacting with CO2, CO3 with CO4, where CO2 and CO4 belong to the telecom system domain.

Suppose first that CO1 requests an operation OpX( ) on CO2. The operation request is translated to the operation Call(CO2.OpX( )) on TD_UA$_{a1}$. The TD_UA$_{a1}$ object will then invoke the equivalent operation Call(CO2.OpX( )) on its peer-object PD_UA$_a$ in the telecom system domain which in turn delivers the request to CO2. This is done without difficulty since TD_UAa1 knows the identifier of PD_UA$_a$. Similarly, CO3 can invoke any operation on CO4 without any problem. The existing mechanism is sufficient to support invocation initiated form the user domain. The opposite that is, object CO2 invoking an operation on CO1 or object CO4 on object CO3 requires additional information and functionality.

Suppose next that CO2 requests an operation OpY( ) on CO1. Again, the operation request is translated to the operation Call(CO1.OpY( )) on PD_UA$_a$. The problem now is that PD_UA$_a$ does not know on which terminal CO1 is located. It is unable to decide whether it should transfer the operation request to TD_UA$_{a1}$ or to TD_UA$_{a2}$. The PD_UA$_a$ holds only the information that User$_a$ is registered at both terminals Terminal$_n$ and Terminal$_m$ but it has no knowledge concerning the location of each object of User$_a$. It is therefore obvious that such information must be supplied to it.

Every object in the user domain wishing to receive request from object on the telecom system domain must therefore be registered by some object in the telecom system domain so that the PD_UA$_a$ object can interrogate in order to obtain the location of the user object. A convenient place to store this information will be the User_Registration$_a$ object.

The user agents $TD\_UA_{a1}$ and $TD\_UA_{a2}$ must be equipped with an additional operation permitting the registration of the user objects in the terminal domain. Such operation, say ObjReg may have the following IDL/ODL specification in which IDL is defined as Interface Definition Language defined in CORBA, and ODL is defined as Object Definition Language defined by TINA-C which is an extension of IDL allowing the definition of object [TIN95h].

ObjReg(in ObjectId objectname, in ObjectId useragentname) objectname is the Computational Interface Identifier of the registered object.

useragentname is the Computational Interface Identifier of the user agent to where the object will be registered. This argument is not necessary when the registration is done locally and may therefore be empty.

This registration of the user objects (CO1 or CO3) may be done by the user objects themselves or by some proxy objects. FIG. 18. The user agents (TD__UA and PD__UA) act as relays for passing the registration information to the User__registration object.

When receiving the operation request ObjReg (objectname,TD__UAname), the TD__UA will call the operation UserObjReg(objectname, TD__UAname) on its peer-object PD__UA. The PD__UA will in its turn call a similar operation UserObjReg(objectname, TD__UAname) on its User__Registration object. Upon receipt of the request, the User__Registration object shall save the object registration information. Its storage capability must therefore be expanded to include such information. The internal data structure can be implemented in different ways. An example is shown in FIG. 17. For each row of the main table, there is assigned an ObjectList containing the identifiers of all object registered at a terminal. To enhance further the functionality, a multiple object registration operation may also be defined for each of the objects TD__UA, PD__UA and User__Registration.

An object can also be deregistered. The procedure for object deregistration and the required operations are quite similar to these for registration. Upon receipt of an operation UserObjDereg(objectname, TD__UAname), the User__Registration fetches the corresponding ObjectList and removes the identifier of the specified object. When a row of the main table is remove, i.e. a user deregistration for a terminal is executed, the corresponding ObjectList will also be deleted.

In addition to the object registration and deregistration operations, the User__registration object must also have an operation other objects may use in order to request object registration information:

GetObjReg(in ObjectId objectname, out ObjectId useragentname)

When receiving an operation request Call(CO1.OpY( )) from CO2 addressed to CO1, and CO1 is not in the telecom system domain, the $PD\_UA_a$ invokes GetObjReg(CO1, AgentToCall) on its User__Registration object. The identifier of $TD\_UA_{a1}$ is returned in the parameter AgentToCall. The $PD\_UA_a$ can proceed to invoke Call(CO1.OpY( )) on $TD\_UA_{a1}$. The operation is finally conveyed all the way to $TD\_UA_{a1}$ which call OpY on CO1. The result will be returned using the same path back to CO2.

Merits of the Invention

The present invention provide user mobility in distributed system.

It is quite flexible since it is using agent technology which allows modification of the internal implementation of the agents without affecting the rest of the system.

It can be used in any type of networks, fixed or mobile, public or private, local-area or wide-area, wireline or wireless.

It also allows several users to use same terminal.

It also allows one user to use several terminals simultaneously.

It ensures the user privacy by recording and separating objects belonging different users.

What is claimed is:

1. A system for providing user or personal mobility in a communications system, the system comprising:

a first user in a user domain, wherein the first user is using a first terminal;

said first terminal, second and third terminals being in a terminal domain;

a Telecom domain;

wherein user mobility support is implemented by use of a plurality of different agents for each user on the first terminal, wherein a first agent $PD\_UA_a$ for the first user is located in the Telecom domain and at least a second agent $TD_m\_UA_a$ for the first user is located at said first terminal in the terminal domain, and wherein the first and second agents collaborate in order to enable interactions involving the first user, and wherein said first user can use each of said first and second terminals at the same time by having the first user's agent $TD_m\_UA_a$ on the first and second terminals at the same time; and wherein said second agent $TD_m\_UA_a$ for the first user and a third agent for a second user are at said first terminal such that multiple agents for respective different users are at said first terminal, so that the first and second users can use/share said first terminal at the same time.

2. The system of claim 1, wherein a default user is registered at said first terminal, and a default agent TD__UA is always present at said first terminal.

3. Arrangement as claimed in claim 1, characterized in that operations on an object residing in the Telecom domain initiated by an object residing in a user domain are issued to an agent $TD\_UA_a$, which forwards to a peer-object $PD\_UA_a$ which in turn invokes them on the addressed object on the Telecom domain.

4. Arrangement as claimed in claim 3, characterized in that operations initiated by an object in the Telecom domain are made to the agent $PD\_UA_a$ which sends to a terminal agent $TA_m$ of the respective terminal m in order to be delivered to the $TD_m\_UA_a$, the user agent on the correct terminal, which will finally invoke operations on the objects residing on the user domain.

* * * * *